(12) United States Patent
Okabe

(10) Patent No.: US 10,688,941 B2
(45) Date of Patent: Jun. 23, 2020

(54) DISPLAY CONTROL DEVICE, VEHICLE SURROUNDINGS DISPLAY SYSTEM AND RECORDING MEDIUM

(71) Applicant: PANASONIC INTELLECTUAL PROPERTY MANAGEMENT CO., LTD., Osaka (JP)

(72) Inventor: Yoshimasa Okabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/291,871

(22) Filed: Mar. 4, 2019

(65) Prior Publication Data
US 2019/0275956 A1 Sep. 12, 2019

(30) Foreign Application Priority Data
Mar. 7, 2018 (JP) .................. 2018-041112

(51) Int. Cl.
*B60R 11/04* (2006.01)
*B60R 11/02* (2006.01)

(52) U.S. Cl.
CPC .......... *B60R 11/04* (2013.01); *B60R 11/0229* (2013.01); *B60R 11/0264* (2013.01); *B60R 2300/105* (2013.01); *B60R 2300/305* (2013.01); *B60R 2300/8026* (2013.01)

(58) Field of Classification Search
CPC . B60R 11/0229; B60R 11/0264; B60R 11/04; B60R 1/00; B60R 2300/105; B60R 2300/305; B60R 2300/8026
See application file for complete search history.

(56) References Cited

U.S. PATENT DOCUMENTS

| | | | | |
|---|---|---|---|---|
| 2011/0069169 | A1* | 3/2011 | Kadowaki | B60R 1/00 348/148 |
| 2013/0307985 | A1* | 11/2013 | Numata | B60R 1/00 348/148 |
| 2017/0106797 | A1 | 4/2017 | Okohira et al. | |

(Continued)

FOREIGN PATENT DOCUMENTS

JP 2010-047253 A 3/2010

OTHER PUBLICATIONS

U.S. Appl. No. 16/351,164 to Yoshimasa Okabe, filed Mar. 12, 2019.

(Continued)

*Primary Examiner* — Mohammed S Rahaman
(74) *Attorney, Agent, or Firm* — Greenblum & Bernstein, P.L.C.

(57) ABSTRACT

An imaging device images surroundings of a vehicle. The display control device generates a display image having a distance guidance line indicating a position away from the vehicle by a predetermined distance and an auxiliary line to be added along the distance guidance line and having an appearance different from the distance guidance line superimposed on the image of the vehicle surroundings captured by the imaging device. The display device displays the display image generated by the display control device. The display control device generates a display image in which the mode of combination of the distance guidance line and the auxiliary line is changed in at least one position.

8 Claims, 17 Drawing Sheets

(56) References Cited

U.S. PATENT DOCUMENTS

2018/0154830 A1\* 6/2018 Tsuji ........................ B60R 1/00
2019/0096261 A1\* 3/2019 Hayashi ................. H04N 7/183

OTHER PUBLICATIONS

U.S. Appl. No. 16/291,702 to Yoshimasa Okabe, filed Mar. 4, 2019.
U.S. Appl. No. 16/351,204 to Masato Inoue et al., filed Mar. 12, 2019.
U.S. Appl. No. 16/289,006 to Masazumi Yamazaki, filed Feb. 28, 2019.

\* cited by examiner

FIG.6
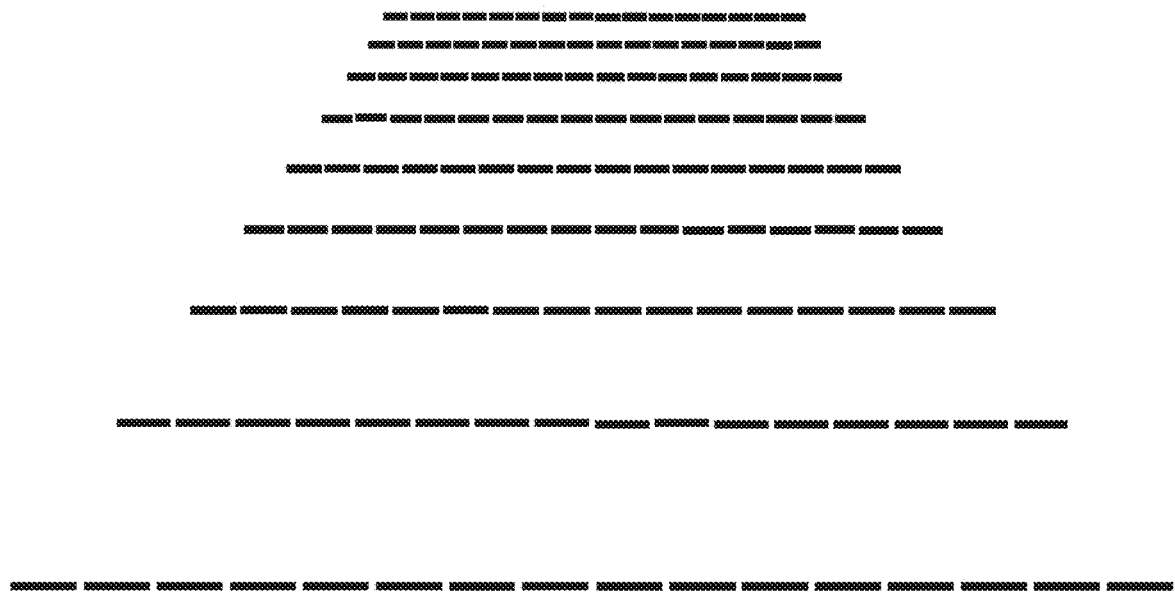

DISPLAY CONTROL DEVICE, VEHICLE SURROUNDINGS DISPLAY SYSTEM AND RECORDING MEDIUM

BACKGROUND

1. Field

The present disclosure relates to data processing technology, and more particularly to a technology for displaying video images of vehicle surroundings.

2. Description of the Related Art

A driver needs to visually check the status of vehicle surroundings to achieve safety driving of the vehicle. In conventional practices, side mirrors or the like have been used in order to check regions difficult to be visually checked directly. However, there are cases where a vehicle is equipped with a camera monitoring system that uses in-vehicle cameras to image the status of the vehicle surroundings and displays the captured image on a monitor or the like.

Patent Document 1: JP 2010-47253 A

In an image of the camera monitoring system in conventional practices, it has been sometimes difficult to grasp the distance between an own vehicle and an other vehicle traveling behind or on the side of the own vehicle in the lateral direction.

SUMMARY

The present disclosure has been made in view of such circumstances, and one object is to provide a technology of generating an image for suitable display from images of the surroundings of the vehicle.

In order to solve the above problem, a display control device of one aspect of the present disclosure is a display control device that controls to display an image of surroundings of a vehicle on a display device, the display control device including an image processor structured to superimpose a distance guidance line indicating a position away from the vehicle by a predetermined distance and an auxiliary line to be added along the distance guidance line and having an appearance different from the distance guidance line on the image of the surroundings of the vehicle. The display control device changes the mode of combination of the distance guidance line and the auxiliary line in at least one position.

Another aspect of the present disclosure is a vehicle surroundings display system. A vehicle surroundings display system includes: an imaging device structured to image surroundings of a vehicle; a display control device structured to generate a display image having a distance guidance line indicating a position away from the vehicle by a predetermined distance and an auxiliary line to be added along the distance guidance line and having an appearance different from the distance guidance line superimposed on the image of the surroundings of the vehicle captured by the imaging device; and a display device structured to display the display image generated by the display control device. The display control device generates a display image in which the mode of combination of the distance guidance line and the auxiliary line is changed in at least one position.

Note that representations of arbitrary combinations of the above-described constituent elements and expressions of the present disclosure converted between a method, a computer program, a recording medium recording a computer program, and a vehicle equipped with the present device would also be effective as embodiments of the present disclosure.

BRIEF DESCRIPTION OF THE DRAWINGS

FIG. 6 is a view illustrating subjective vision;

DETAILED DESCRIPTION

The invention will now be described by reference to the preferred embodiments. This does not intend to limit the scope of the present invention, but to exemplify the invention.

A vehicle surroundings display system according to an embodiment is also referred to as a camera monitoring system and presents a captured rear image or side image of an own vehicle to an occupant (hereinafter referred to as a driver). The vehicle surroundings display system according to an embodiment presents to the driver an image with enhanced visibility of the degree of separation of an other vehicle traveling behind or sideways of the vehicle from an own vehicle in the lateral direction.

Specifically, the vehicle surroundings display system displays a display image obtained by adding a distance guidance line indicating a guidance of the distance in the longitudinal direction from the own vehicle to a rear image of the vehicle captured by the camera and by adding, along the distance guidance line, an auxiliary line different in color from the distance guidance line. The vehicle surroundings display system generates a display image in which the mode of combination of the distance guidance line and the auxiliary line is changed in at least one place. This makes it easier to grasp the sense of distance in the lateral direction by using a point (hereinafter also referred to as "node") at which the mode of combination of the distance guidance line and the auxiliary line is changed.

Note that the present disclosure uses "along" as a phrase including "overlap", "be in contact with", and "to be positioned in parallel at intervals". For example, a case where the auxiliary line runs "along" the distance guidance line includes: a case where the auxiliary line "overlaps" a long side of a rectangular region indicating the distance guidance line; a case where the auxiliary line comes in contact with the long side of the rectangular region indicating the distance guidance line without overlapping; and a case where the auxiliary line is positioned "in parallel with and having an interval from" the long side of the rectangular region indicating the distance guidance line.

Figure 1A:
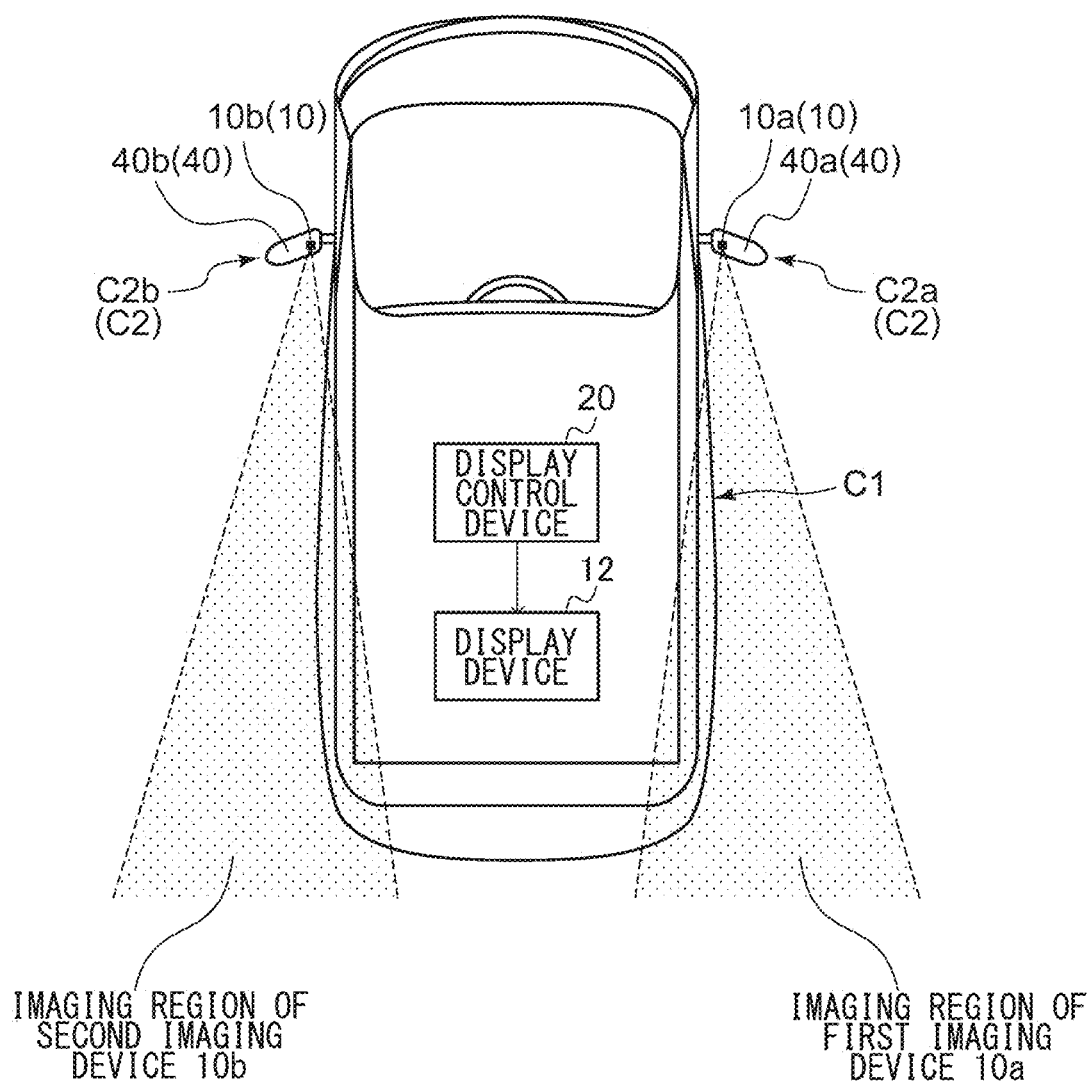
FIG. 1A is a diagram schematically illustrating a configuration of a vehicle of an embodiment.
Figure 1B:
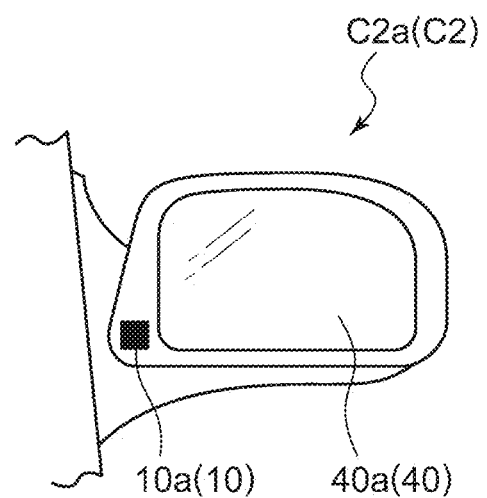
FIG. 1B is a diagram schematically illustrating a configuration of a vehicle of an embodiment.

FIGS. 1A and 1B schematically illustrates a configuration of a vehicle C1 according to an embodiment. In particular, FIG. 1A illustrates an overall configuration of the vehicle C1. The vehicle C1 is equipped with a vehicle surroundings display system 22 (described below). In the vehicle surroundings display system 22, an imaging device 10, a display control device 20, and a display device 12 operate in cooperation to present a video image described below to the driver of the vehicle C1. The vehicle C1 includes: a first side mirror C2a and a second side mirror C2b collectively referred to as side mirrors C2; a first imaging device 10a and a second imaging device 10b collectively referred to as the imaging devices 10, the display control device 20, and the display device 12. The first side mirror C2a is installed on the right side of the vehicle C1, while the second side mirror C2b is installed on the left side of the vehicle C1. The first side mirror C2a is equipped with the first imaging device 10a and a first mirror 40a, while the second side mirror C2b is equipped with the second imaging device 10b and a second mirror 40b. Here, the vehicle C1 is assumed to be a right hand drive vehicle.

FIG. 1B illustrates a configuration of the first side mirror C2a of the vehicle C1. The first imaging device 10a is arranged at a base portion of the body of the vehicle C1 on the first side mirror C2a. The second side mirror C2b also has a structure similar to the structure of the first side mirror C2a. Returning to FIG. 1A. The first imaging device 10a images the rearward right side of the vehicle C1. A region imaged by the first imaging device 10a is indicated as an "imaging region of the first imaging device 10a". The second imaging device 10b images the rearward left side of the vehicle C1. The region imaged by the second imaging device 10b is indicated as an "imaging region of the second imaging device 10b". The vehicle surroundings display system 22 displays the video image captured by the imaging device 10 on the display device 12. The "imaging region of the first imaging device 10a" and the "imaging region of the second imaging device 10b" include a portion of the side body of the vehicle C1 including a doorknob.

Figure 2:
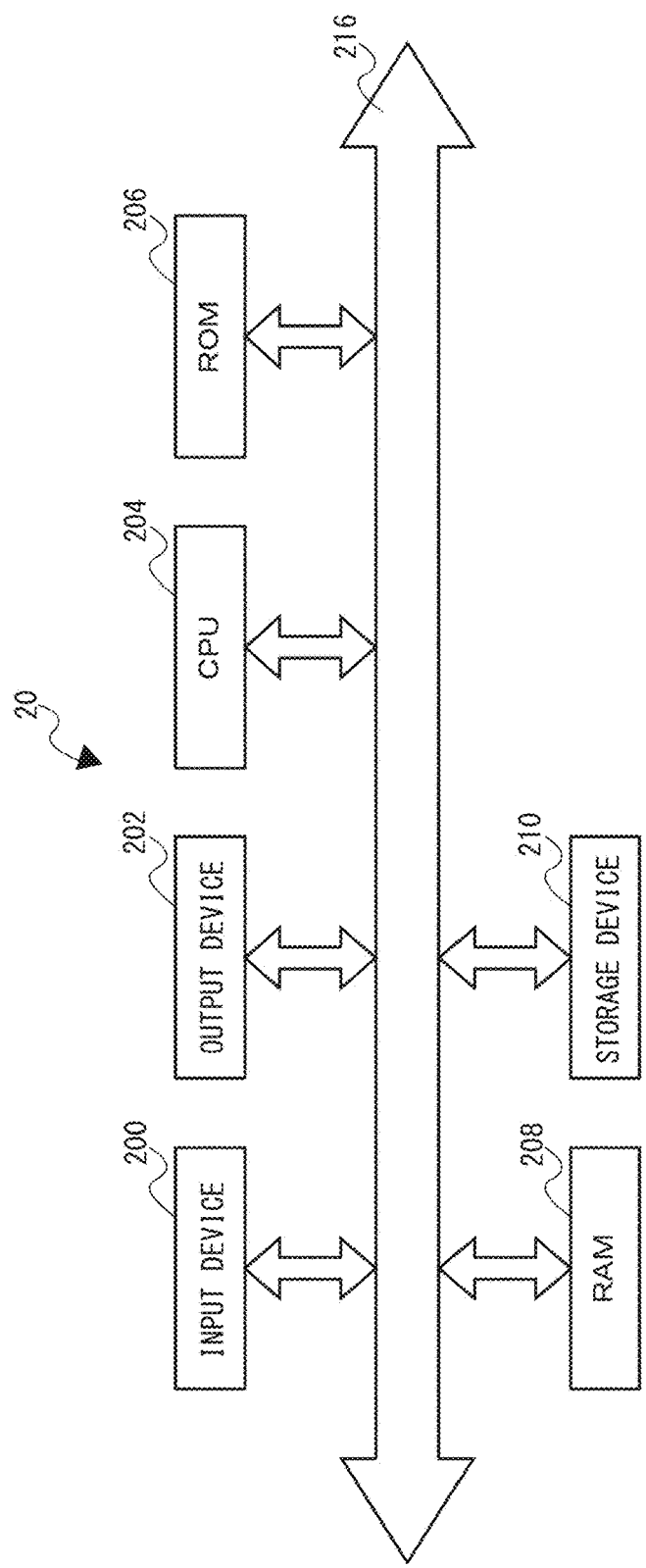
FIG. 2 is a diagram illustrating an example of a hardware configuration of a display control device in FIG. 1A.

FIG. 2 illustrates an example of a hardware configuration of the display control device 20 in FIG. 1A. The display control device 20 includes an input device 200, an output device 202, a CPU 204, a ROM 206, a RAM 208, and a storage device 210, and these constituents are connected via a bus 216. A computer program including a plurality of modules corresponding to a plurality of functional blocks (described below with reference to FIG. 3) of the display control device 20 may be installed in the ROM 206 or the storage device 210. The CPU 204 may read the computer program onto the RAM 208 and execute the program to implement the functions of individual functional blocks.

Figure 3:
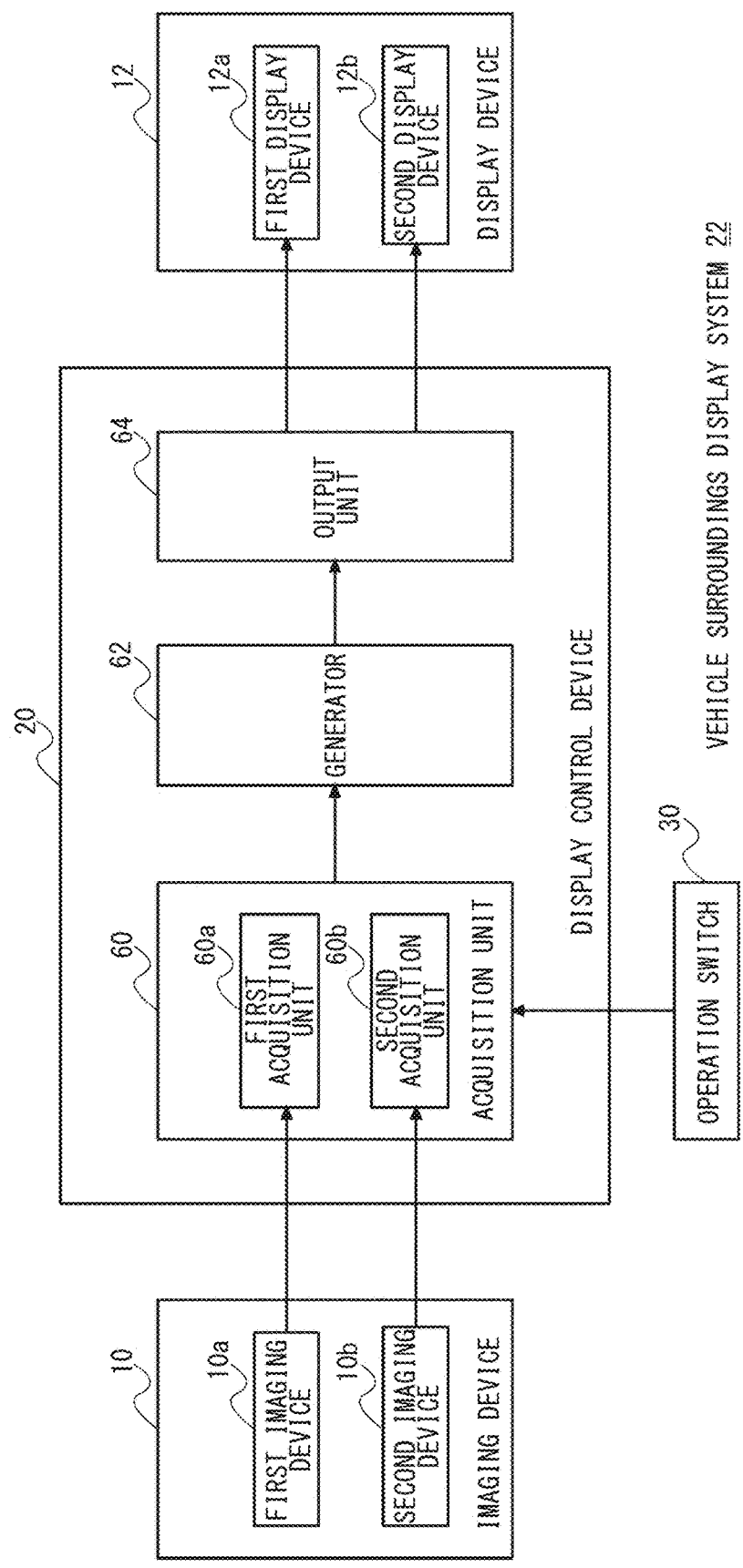
FIG. 3 is a block diagram illustrating a functional configuration of a vehicle surroundings display system according to an embodiment.

FIG. 3 is a block diagram illustrating a functional configuration of the vehicle surroundings display system 22 according to an embodiment. As partially described above, the vehicle surroundings display system 22 includes the imaging device 10, the display control device 20, the display device 12, and an operation switch 30. These devices may be connected via a known in-vehicle network such as Media Oriented Systems Transport (MOST).

Individual blocks indicated in the block diagram of the present disclosure can be implemented, in terms of hardware, by elements or a mechanical device such as CPU and memory of a computer, and can be implemented, in terms of software, by computer programs or the like. This exemplary case, however, depicts functional blocks implemented by hardware and software in cooperation. Implementability of these functional blocks in various forms using the combination of hardware and software would be understandable by those skilled in the art.

As illustrated in FIG. 1A, the imaging device 10 is a video camera that captures the rear of the vehicle C1 to generate an image (video image) including the rear of the vehicle C1. The imaging device 10 outputs the captured image to the display control device 20. The display control device 20 is an information processing device that generates a display image to be displayed on the display device 12 on the basis of a captured image by the imaging device 10. The display control device 20 may be implemented as an electronic control unit (ECU). The display image is also referred to as a driving support image for supporting the operation of the vehicle C1, and the display control device 20 is also represented as a driving assistance device.

The display device 12 displays the display image generated by the display control device 20 on the screen. The display device 12 includes a first display device 12a and a second display device 12b. The first display device 12a displays an image captured by the first imaging device 10a, while the second display device 12b displays an image captured by the second imaging device 10b.

The display device 12 may be shared as a display of a car navigation device or the like (not illustrated), or may be a dedicated device of the vehicle surroundings display system 22. Although the display device 12 of the embodiment is assumed to be provided inside the vehicle C1 (inside the cabin), the display device 12 may be provided at a location of the mirror 40 of the side mirror C2. For example, the first display device 12a may be provided in the position of the first mirror 40a of the first side mirror C2a, and the second display device 12b may be provided in the position of the second mirror 40b of the second side mirror C2b.

The operation switch 30 receives inputs of various types of operation onto the display control device 20.

The operation switch 30 may be provided as dedicated hardware of the vehicle surroundings display system 22. Alternatively, the operation switch 30 may be displayed as an image object on a display of a car navigation device (not illustrated) or the like. An instruction of the driver is input to the display control device 20 via the operation switch 30, and then, the display control device 20 generates a display image including a distance guidance line in response to the instruction from the driver.

The display control device 20 will be described in detail. The display control device 20 includes: a first acquisition unit 60a and a second acquisition unit 60b collectively referred to as an acquisition unit 60; a generator 62; and an output unit 64. The acquisition unit 60 obtains an image from the imaging device 10. The acquisition unit 60 is constituted by a volatile memory, for example, and temporarily stores a non-processed image, even though predetermined processing may be applied on the image. The first acquisition unit 60a obtains a rear image of the vehicle C1 captured by the first imaging device 10a and the second acquisition unit 60b obtains a rear image the vehicle C1 captured by the second imaging device 10b. The acquisition unit 60 outputs the obtained image to the generator 62.

The generator 62 can also be referred to as an image processor. The generator 62 processes the image obtained by the first acquisition unit 60a, that is, the image captured by the first imaging device 10a, so as to generate a display image. The output unit 64 outputs and displays the display image onto the first display device 12a. The generator 62 also processes the image obtained by the second acquisition unit 60b, that is, the image captured by the second imaging device 10b, so as to generate a display image. The output unit 64 outputs and displays the display image onto the second display device 12b.

Hereinafter, processing of generating a display image from the image obtained by the second acquisition unit 60b (hereinafter also referred to as "captured image") will be described in detail. The processing of generating a display image from the image obtained by the first acquisition unit 60a is performed in a similar manner.

The generator 62 generates a display image in which a distance guidance line indicating a position away from the vehicle C1 by a predetermined distance is superimposed on the captured image. The generator 62 arranges an auxiliary line that appears different from the distance guidance line along the distance guidance line on the display image. The distance guidance line and the auxiliary line can also be defined as guide lines virtually arranged in the imaged rear space. The generator 62 sets the distance guidance line and the auxiliary line in mutually different colors. For example, the distance guidance line may be orange and the auxiliary line may be black. As a modification, the generator 62 may set different patterns on the distance guidance line and the auxiliary line individually.

The generator 62 may set the color of an auxiliary line 112 in a color having high contrast with respect to the color of a distance guidance line 110. For example, a complementary color of the distance guidance line 110 may be set as the color of the auxiliary line 112. The generator 62 may set, as the color of the auxiliary line 112, a color having brightness or saturation difference with respect to the color of the distance guidance line 110 of a level being a predetermined threshold or more.

In the embodiment, the generator 62 generates a display image in which in which a plurality of distance guidance lines are arranged in a plurality of positions with different distances from the vehicle C1 and a plurality of auxiliary lines are arranged along the plurality of distance guidance lines. That is, the generator 62 generates a display image having a plurality of sets of the distance guidance line and the auxiliary line superimposed on the captured image.

Furthermore, the generator 62 generates a display image in which mode of combination of the distance guidance line and the auxiliary line is changed in at least one position of the set of the distance guidance line and the auxiliary line. In other words, the generator 62 generates a display image having a node in at least one position of a set of a distance guidance line and an auxiliary line. Furthermore, the generator 62 generates a display image in which the mode of combination of the distance guidance line and the auxiliary line is changed in positions having an equal distance from the vehicle C1 in the lateral direction on the plurality of distance guidance lines.

Figure 4:
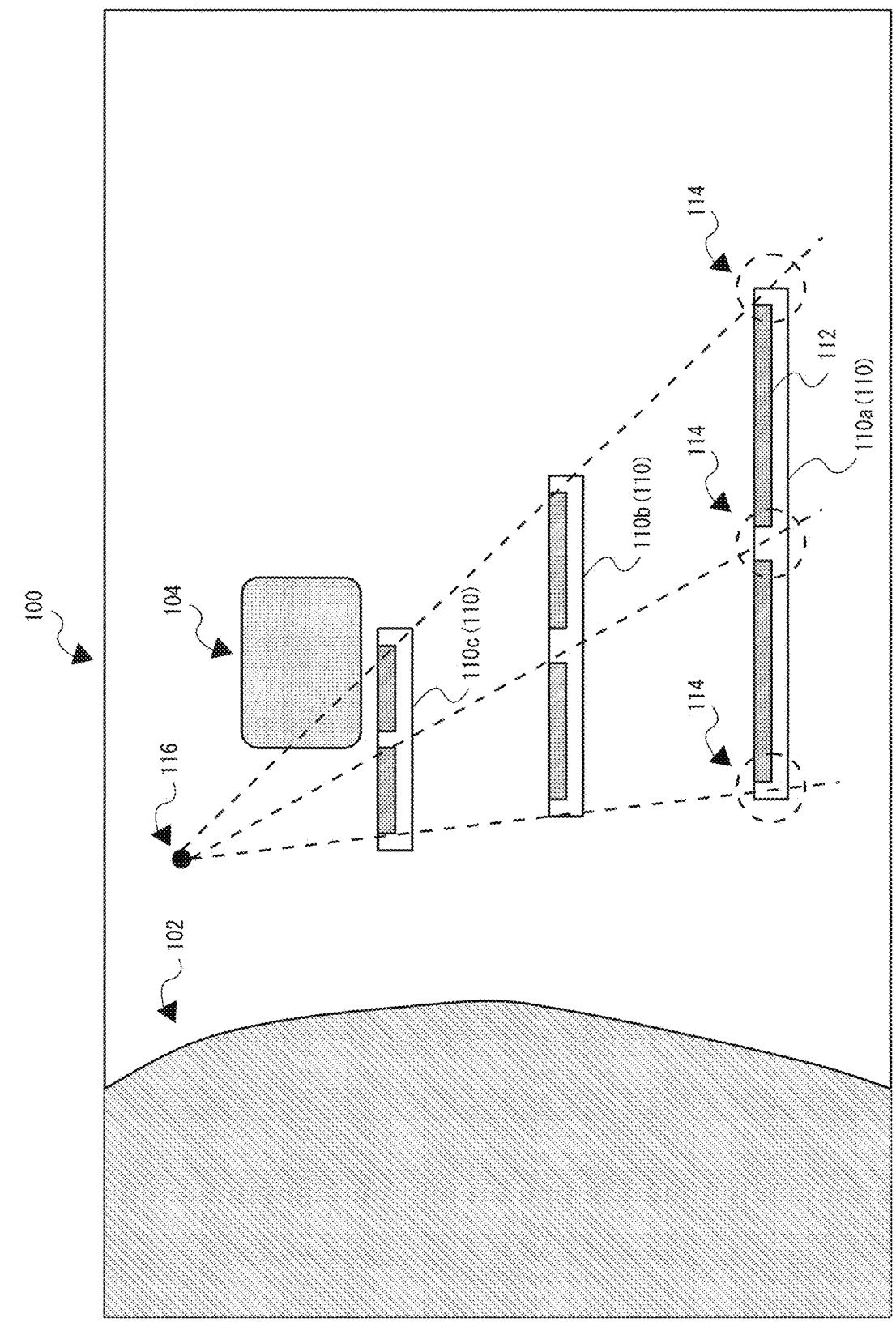
FIG. 4 is a diagram illustrating an example of a display image according to an embodiment.

FIG. 4 indicates an example of a display image according to an embodiment. A display image 100 includes: an own vehicle image 102 being an image of the vehicle C1 itself (left side of the vehicle body); and an other-vehicle image 104 being an image of an other vehicle traveling behind the vehicle C1 (for example, rearward in an adjacent lane). The generator 62 arranges the plurality of distance guidance lines 110 in the display image 100. Specifically, the generator 62 arranges the first distance guidance line 110a in a position (rear position) five meters away in the longitudinal direction (front-rear direction), while arranging the second distance guidance line 110b in a position ten meters away, and arranging a third distance guidance line 110c in a position 15 meters away, individually from the vehicle C1.

The generator 62 arranges the auxiliary line 112 along each of the plurality of distance guidance lines 110 (overlapping over the upper side of the distance guidance line 110 in FIG. 4). The generator 62 gives cleavage in the auxiliary line 112. Specifically, the auxiliary line 112 is not drawn over (that is, hidden) the distance guidance line 110 at end points and the center of the distance guidance line 110. This leads to formation of a node 114 (portion surrounded by a broken line circle) in three positions of the left end point, the center, and the right end point of each of the first distance guidance line 110a, the second distance guidance line 110b, and the third distance guidance line 110c.

The generator 62 hides the auxiliary line 112 in a position where the distance from the vehicle C1 in the lateral direction is equal for each of the first distance guidance line 110a, the second distance guidance line 110b, and the third distance guidance line 110c. That is, the node 114 is provided at positions having an equal lateral distance from the vehicle C1 in the lateral direction. For example, the left end of each of the three distance guidance lines 110 is set to a position having a two meter distance from the vehicle body side of the vehicle C1 in the lateral direction. With this setting, the left end node 114 of each of the three distance guidance lines 110 is formed in a position having two meter distance from the vehicle body side of the vehicle C1 in the lateral direction.

The generator 62 sets the lengths in the rear space of the first distance guidance line 110a, the second distance guidance line 110b, and the third distance guidance line 110c to be equal (for example, two meters). With this setting, the right end node 114 of each of the three distance guidance lines 110 is formed in a position having four meter distance from the vehicle body side of the vehicle C1 in the lateral direction.

The generator 62 hides the auxiliary line 112 in positions in the vicinity of the center of each of the plurality of distance guidance lines 110. With this setting, the central node 114 of each of the three distance guidance lines 110 is formed in a position having three meter distance from the vehicle body side of the vehicle C1 in the lateral direction. In the display image 100, nodes of a plurality of distance guidance lines are aligned in order in the vanishing point direction. This vanishing point is an infinite point immediately behind the vehicle C1 and also matches the vanishing point of the boundary line (section line) of the lane when the vehicle C1 is located in parallel with the traveling lane.

According to the vehicle surroundings display system 22 in an embodiment, it is possible to present to the driver the position where the mode of combination of the distance guidance line 110 and the auxiliary line 112 is changed in at least one position (that is, the node 114) in the display image 100, as a guidance of the distance in the lateral direction. For example, a trailing vehicle or a lane mark can be aligned with the node of the distance guidance line 110, making it possible for the driver to grasp the suitability of the position of the own vehicle in the lateral direction and to reliably and intuitively. For example, this makes it easier for the driver to easily grasp that the other vehicle indicated by the other-vehicle image 104 in FIG. 4 is about three meters away from the left side of the own vehicle.

Furthermore, nodes of a plurality of distance guidance lines being aligned in order in the vanishing point direction would make it possible to allow a line connecting the corresponding nodes between the plurality of distance guidance lines (that is, a distance guidance line extending in the lateral direction) to appear to be drawn on a vision of a viewer of the display image. This is a phenomenon referred to as "subjective vision", demonstrating that a visual system in human brain corrects a pattern recognized from an image, rather than recognizing the visual image as it is.

Figure 5:
FIG. 5 is a view illustrating subjective vision.

FIGS. 5 and 6 are views illustrating the subjective vision. For example, it is probable that one visually perceives as if there are white lines extending towards a star although horizontal lines alone are drawn in FIG. 5. This is a result of recognizing a change in the same mode aligned on the straight line as a straight line pattern in a depth direction. FIG. 5 is a perspective drawing and the star in the illustration represents the position of the vanishing point.

Additionally, in FIG. 5, the white portions as gaps between the black lines are perceived as brighter points than the other white portions. This is because the visual system of the brain applies edge emphasis processing in perceiving the image captured by the eyes. This leads to the perception that the white sandwiched between black portions can be felt brighter than the white among white surroundings. In other words, the visual system of the brain interpolates bright visible points aligned in a straight line and thus recognized the bright points as a white line extending toward the vanishing point. This effect of subjective vision allows a straight line to be recalled in the driver's brain in a position indicated by a broken line connecting the vanishing point 116 to the node 114 in FIG. 4, for example. Accordingly, even when the other vehicle is positioned away from the distance guidance line 110, the driver can easily recognize the position of the other vehicle in the lateral direction.

When the interval of the gaps in the black line aligned in the left-right direction is shortened, the lines extending in the depth direction is less likely to be recognized. FIG. 6 is a view in a case where gaps are illustrated on a black line at half the interval of the case of FIG. 5. Since the interval of the black line in the depth direction is longer than the repetition interval in the left-right direction, the gaps in the black line aligned as a straight line would be less likely to be recognized. Furthermore, this is also the effect that recognition of the pattern in the depth direction is hindered by the visual stimulation of the repeated pattern in the left and right direction. As a result, the white lines extending toward the vanishing point as perceived in FIG. 5 would be less likely to be perceived in FIG. 6.

In view of this, it is recommended, in an embodiment, to restrict the positions of changing a mode of combination of the distance guidance line 110 and the auxiliary line 112. In the display image 100, it is preferable that there are five or less locations where the mode of combination of the distance guidance line 110 and the auxiliary line 112 is to be changed. In other words, the number of the nodes 114 provided in one set of the distance guidance line 110 and the auxiliary line 112 is preferably five or less. In an embodiment (FIG. 4), the number of the nodes 114 provided in one set of the distance guidance line 110 and the auxiliary line 112 is three. This makes it easier for the driver to perceive that a plurality of nodes 114 is connected across the plurality of distance guidance lines 110.

Figure 7:
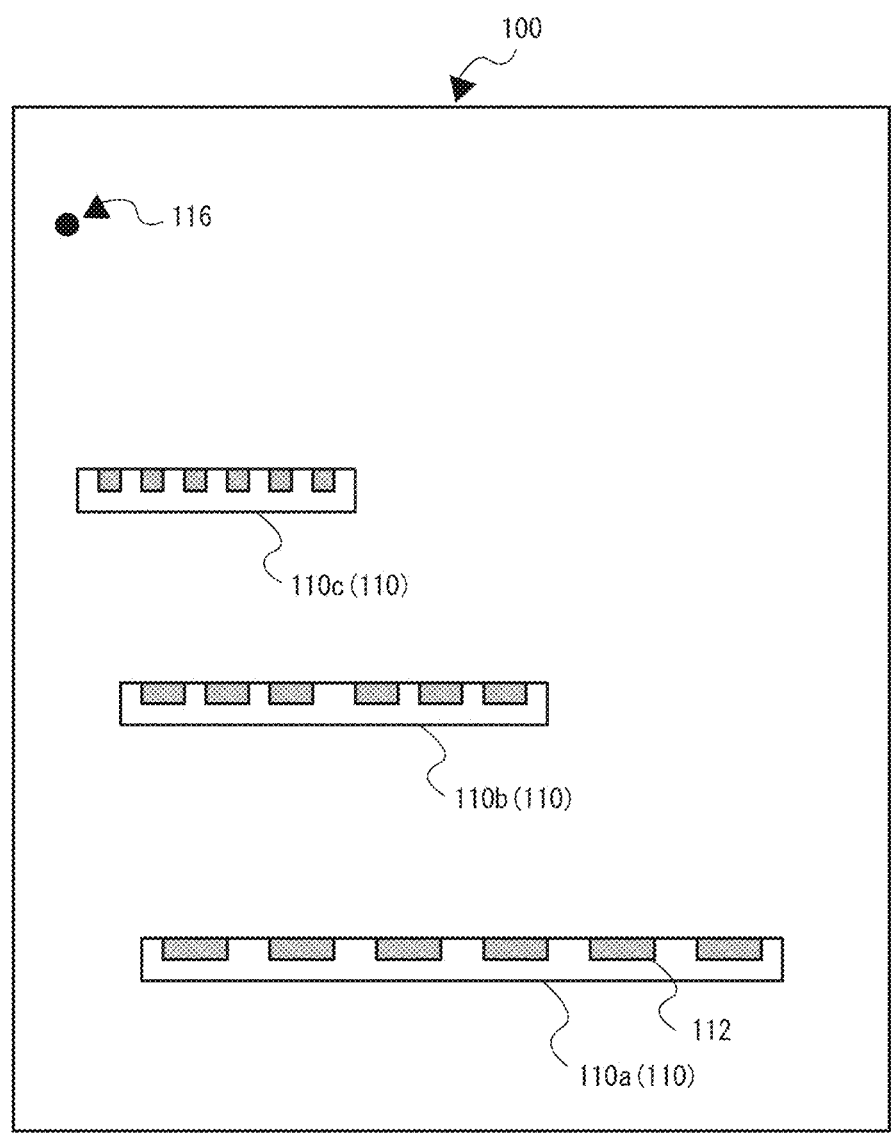
FIG. 7 is a view illustrating an example of a display image for comparison.

FIG. 7 illustrates an example of a display image for comparison. In the display image 100 of FIG. 7, the number of the nodes 114 provided in one set of the distance guidance line 110 and the auxiliary line 112 is seven, which is larger than five. In this case, the nodes just appear to be periodically provided in the lateral direction in one distance guidance line 110. In other words, it is difficult to perceive a virtual line (broken line in FIG. 4) extending in the direction of the vanishing point 116 in the display image 100 of FIG. 7. Restricting the number of nodes would make it for the driver to easily recognize a virtual line extending in the direction of the vanishing point, enabling presentation of a guidance line in the vehicle width direction to the driver. In addition, in view of the function of as a scale, the node can be read in a shorter time in a case where the number of nodes is smaller than the case where the number of nodes is large. Accordingly, display modes having small number of nodes would be more suitable for the in-vehicle display device, which is not to be watched for a long time.

Meanwhile, as a method of indicating to the driver a distance guidance in the lateral direction, it is also conceivable to superimpose and display a distance guidance line in the lateral direction on the display image. However, the display of the vehicle surroundings video image of the vehicle has the most important purpose of confirming the surroundings of the vehicle, that is, safety confirmation, and therefore, excessively increasing the number of lines to be superimposed and displayed might hinder visual perception of the vehicle surroundings video image. In particular, in the case of a mirrorless system that replaces a rearview mirror with a device that displays the rear image, the ratio of covering the rear image by the guidance line or the like is strictly restricted by regulations. Accordingly, the method of allowing visual recognition of lines not indicated on the image as disclosed in an embodiment of the present invention would be more suitable than the method of overlapping and displaying the distance guidance lines in the lateral direction on the display image in view of the purpose of safety confirmation and the requirement of regulations.

The present disclosure has been described with reference to embodiments. The above-described embodiments have been described merely for illustrative purposes. Rather, it can be readily conceived by those skilled in the art that various modifications may be made in making various combinations of the above-described components or processes of the embodiments, which are also encompassed in the technical scope of the present disclosure.

A first modification will be described. The generator 62 of the display control device 20 may generate the display image 100 in which the auxiliary line 112 is added to at least one of the upper side and/or the lower side of the distance guidance line 110. It means that, the auxiliary line is added to upper side or the lower side or both sides of the distance guidance line. In this case, the generator 62 does not need to add the auxiliary line 112 to a portion of the side to which the auxiliary line 112 is to be added. In other words, in a predetermined range of the distance guidance line 110, that is, in a position where the mode of combination of the distance guidance line 110 and the auxiliary line 112 is to be changed, the generator 62 may hide the auxiliary line 112 in the vicinity of each of the upper side and the lower side.

Figure 8A:
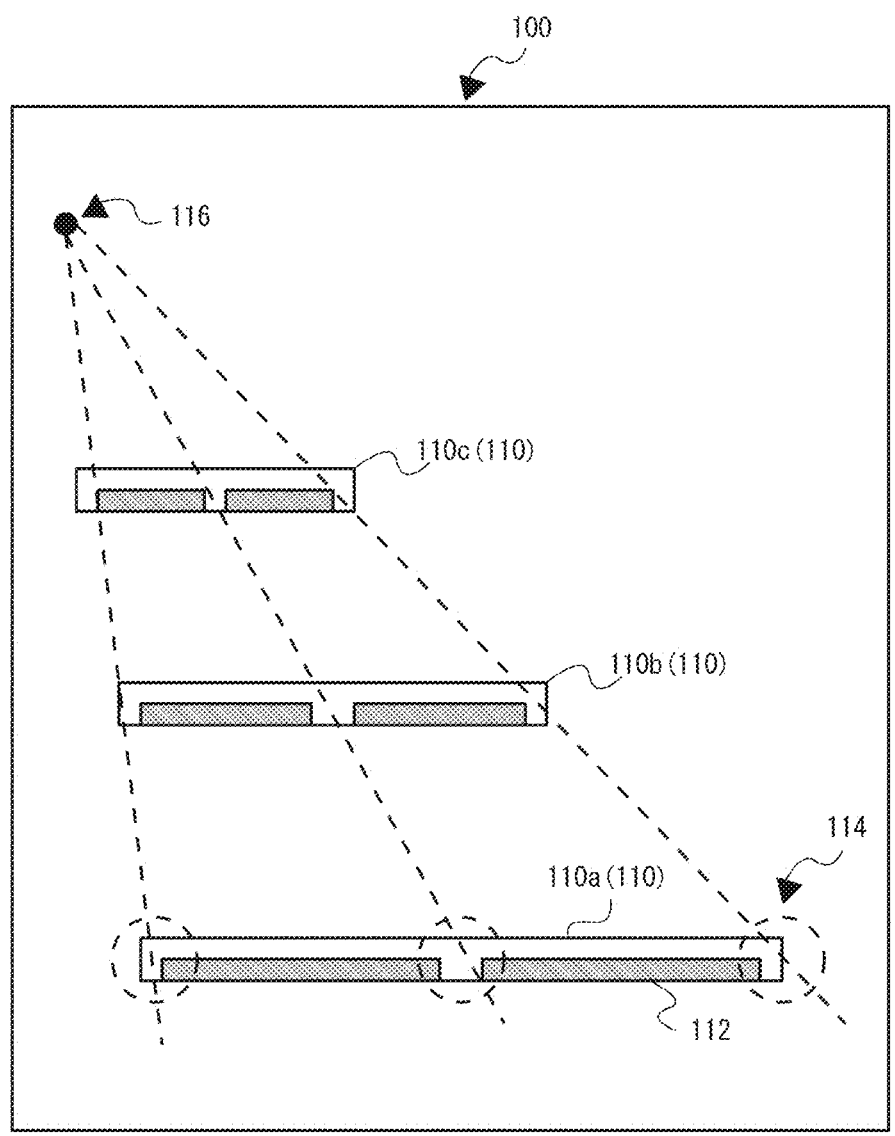
FIG. 8A is a view illustrating an example of a display image according to a first modification.
Figure 8B:
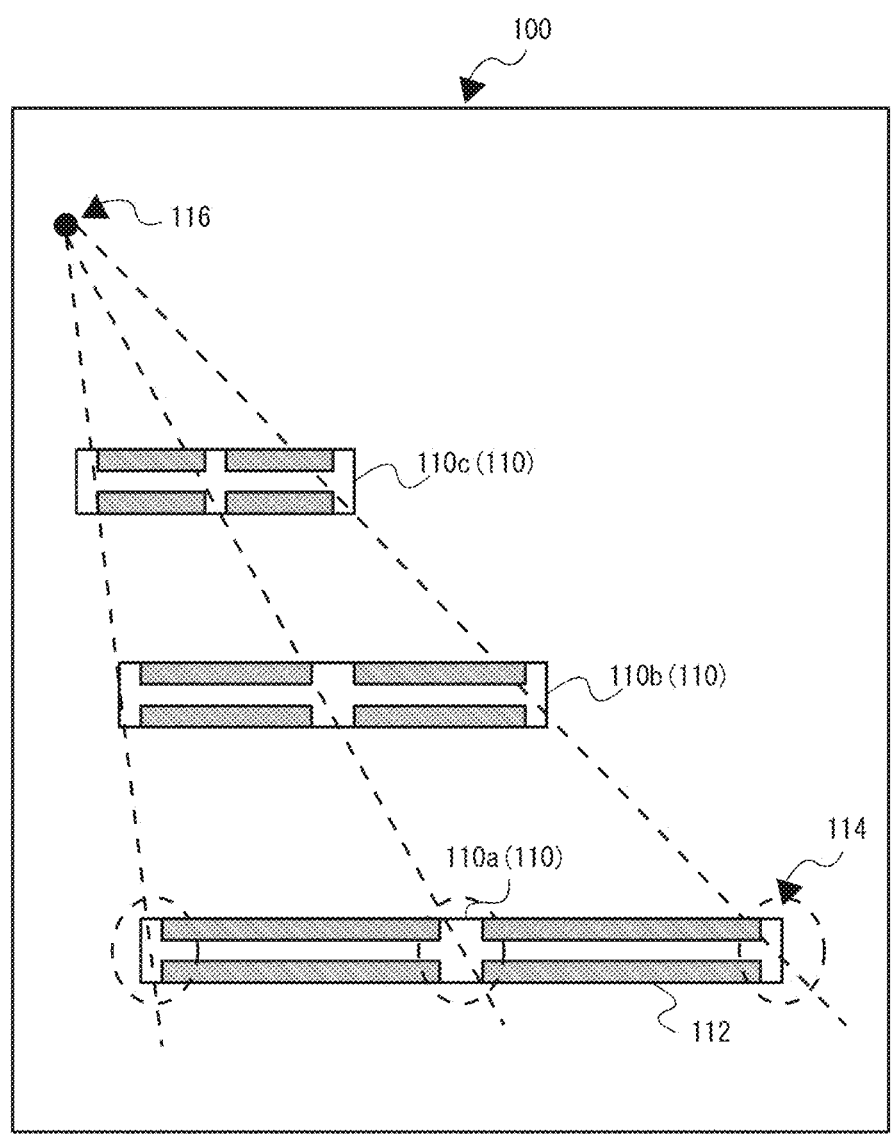
FIG. 8B is a view illustrating an example of a display image according to the first modification.

FIGS. 8A and 8B illustrate examples of a display image according to the first modification. In FIG. 8A, the auxiliary line 112 is added so as to overlap the lower side of the distance guidance line 110. In FIG. 8B, the auxiliary line 112 is added so as to overlap both the upper side and the lower side of the distance guidance line 110. In each of FIGS. 8A and 8B, three nodes 114 are formed by not adding the auxiliary line 112 to the left end, the center, and the right end of each of the plurality of distance guidance lines 110.

In the display image 100 of the first modification, the width of the distance guidance line 110 is increased at a portion with no addition of the auxiliary line 112, so as to form the node 114. This configuration makes it possible present the reference of the distance in the lateral direction to the driver similarly to embodiments. Furthermore, since the distance guidance line 110 and the auxiliary line 112 are compactly fitted within a rectangular region, it is possible to suppress expansion of the range of the background hidden by the distance guidance line 110 and the auxiliary line 112.

A second modification will be described. The generator 62 of the display control device 20 may add the auxiliary line 112 along at least one of the upper side and/or the lower side of the distance guidance line 110. In other words, the generator 62 may add the auxiliary line 112 in a position coming in contact with the upper side or the lower side or the both sides of the distance guidance line 110. Alternatively, the generator 62 may add the auxiliary line 112 in parallel to the distance guidance line in a position spaced at a predetermined interval from at least one of the upper side and/or the lower side of the distance guidance line 110. In other words, the generator 62 may add the auxiliary line 112 in a position that is a position in the vicinity of the upper side or the lower side or the both sides of the distance guidance line 110, a position being parallel to the upper side or the lower side or the both sides, and a position not overlapping with the distance guidance line 110. In this case, the generator 62 does not need to add the auxiliary line 112 to a portion of the side to which the auxiliary line 112 is to be added. In other words, in a predetermined range of the distance guidance line 110, the generator 62 may hide the auxiliary line 112 in the vicinity of the upper side nor and the lower side.

Figure 9A:
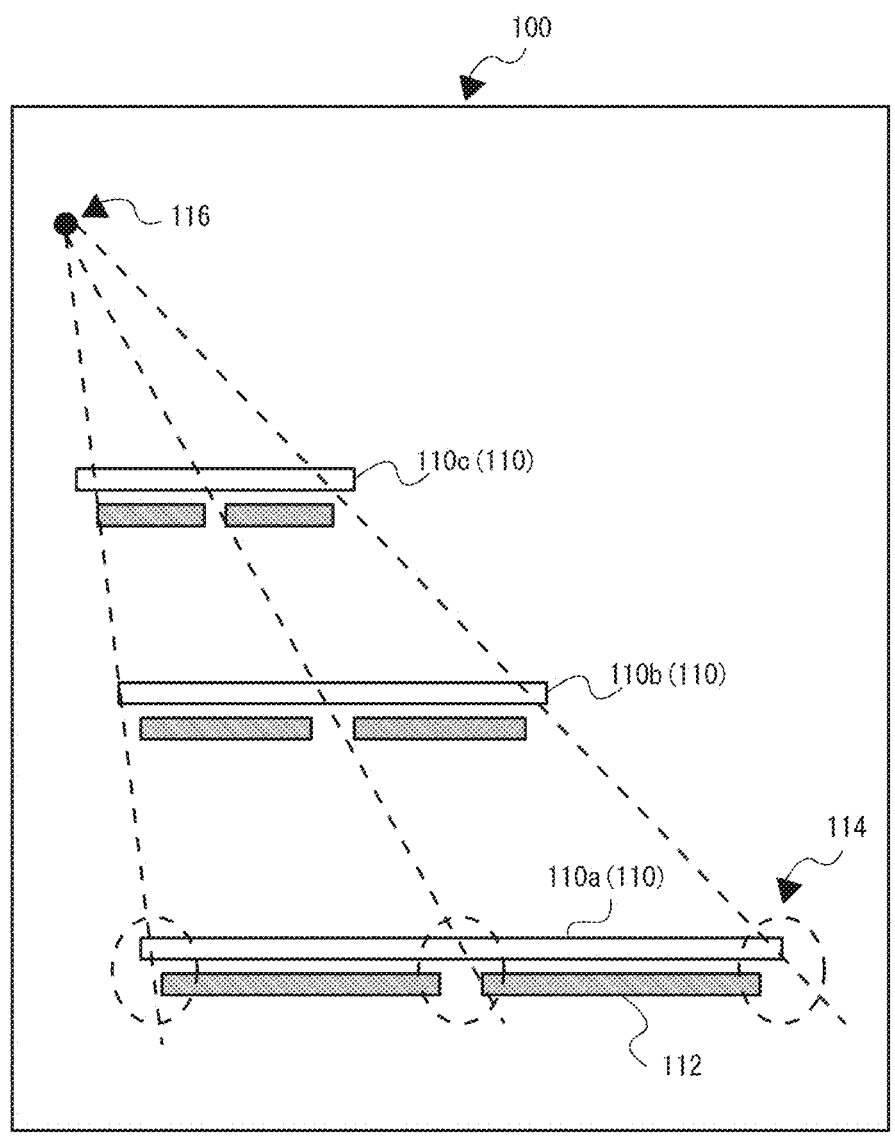
FIG. 9A is a view illustrating an example of a display image according to a second modification.
Figure 9B:
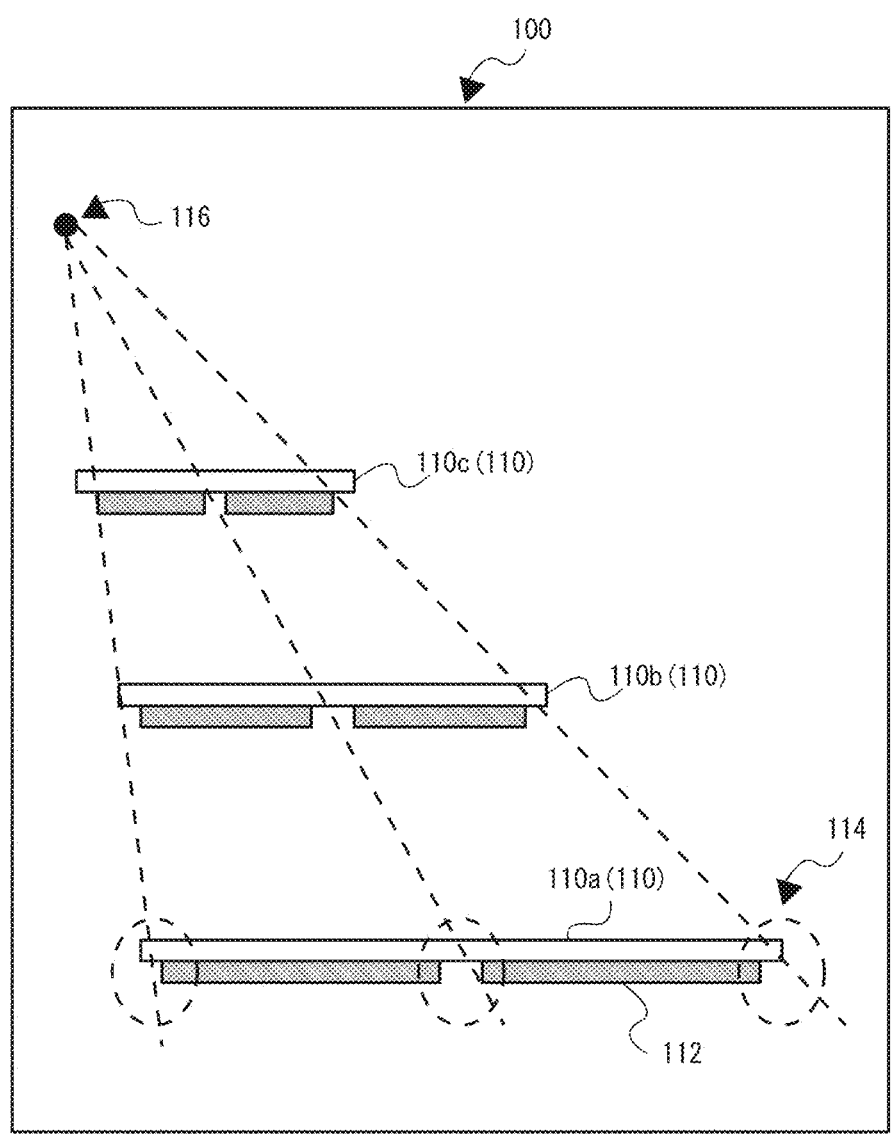
FIG. 9B is a view illustrating an example of a display image according to the second modification.
Figure 9C:
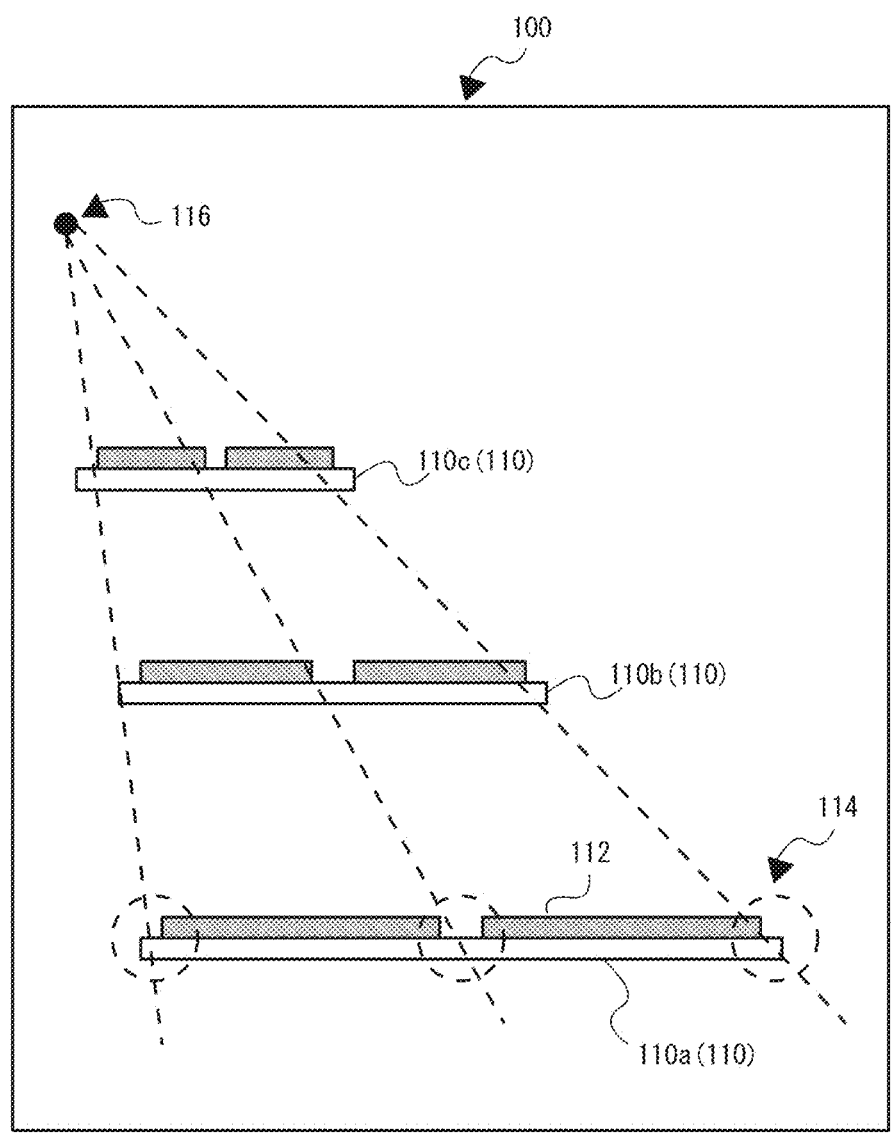
FIG. 9C is a view illustrating an example of a display image according to the second modification.

FIGS. 9A, 9B, and 9C illustrate examples of display images according to the second modification. In FIG. 9A, the auxiliary line 112 is added parallel to the distance guidance line 110 in a position having a predetermined interval (for example one or two pixels) from the lower side of the distance guidance line 110. In FIG. 9B, the auxiliary line 112 is added in parallel with the distance guidance line 110 so as to be in contact with the lower side of the distance guidance line 110 (that is, without separating from the distance guidance line 110). In FIG. 9C, an auxiliary line 112 is added so as to be in contact with the upper side of the distance guidance line 110. In each of FIGS. 9A, 9B and 9C, three nodes 114 are formed by not adding the auxiliary line 112 to the left end, the center, and the right end of each of the plurality of distance guidance lines 110.

In the display image 100 of the second modification, a portion of the distance guidance line 110 to which the auxiliary line 112 is not added can be presented as the node 114. In particular, in a case where the color of the distance guidance line 110 has higher contrast with respect to the background color, the distance guidance line 110 appears to be visually expanded in the gap of the auxiliary line 112, and the driver recognizes such that there are nodes as a whole. Conversely, when the auxiliary line 112 has higher contrast with respect to the background color, it is possible to recognize the gap of the auxiliary line 112 as a node. This configuration makes it possible present the reference of the distance in the lateral direction to the driver similarly to embodiments. The color of the distance guidance line 110 in the second modification may be a complementary color with respect to the color of a standard road and may be a color having a difference in brightness or saturation with respect to the color of a standard road, being a predetermined threshold or more.

Moreover, in the case of adding the auxiliary line 112 to a position having an interval from the distance guidance line 110, when the color of the distance guidance line 110 has a higher contrast compared with the background color, the distance guidance line 110 appears to be visually expanded in the gap of the auxiliary line 112, making it possible for the driver to recognize that there are nodes as a whole. Conversely, when the auxiliary line 112 has higher contrast with respect to the background color, it is possible to recognize the gap of the auxiliary line 112 as a node. Furthermore, by separating the auxiliary line 112 from the distance guidance line 110, it is possible to reduce the width of the background continuously hidden by the set of the distance guidance line 110 and the auxiliary line 112, enabling suppression of degradation of visibility of the background.

A third modification will be described. The generator 62 of the display control device 20 may generate the distance guidance line 110 in which the auxiliary line 112 is added along at least one of the upper side and/or the lower side of the distance guidance line 110. The generator 62 may generate the display image 100 arranged in a mode having part of the distance guidance line alone or both the distance guidance line and the auxiliary line disconnected. In other words, the generator 62 may generate the display image 100 in which both the distance guidance line 110 and the auxiliary line 112 are interrupted in a position where the mode of combination of the distance guidance line 110 and the auxiliary line 112 is to be changed.

Figure 10A:
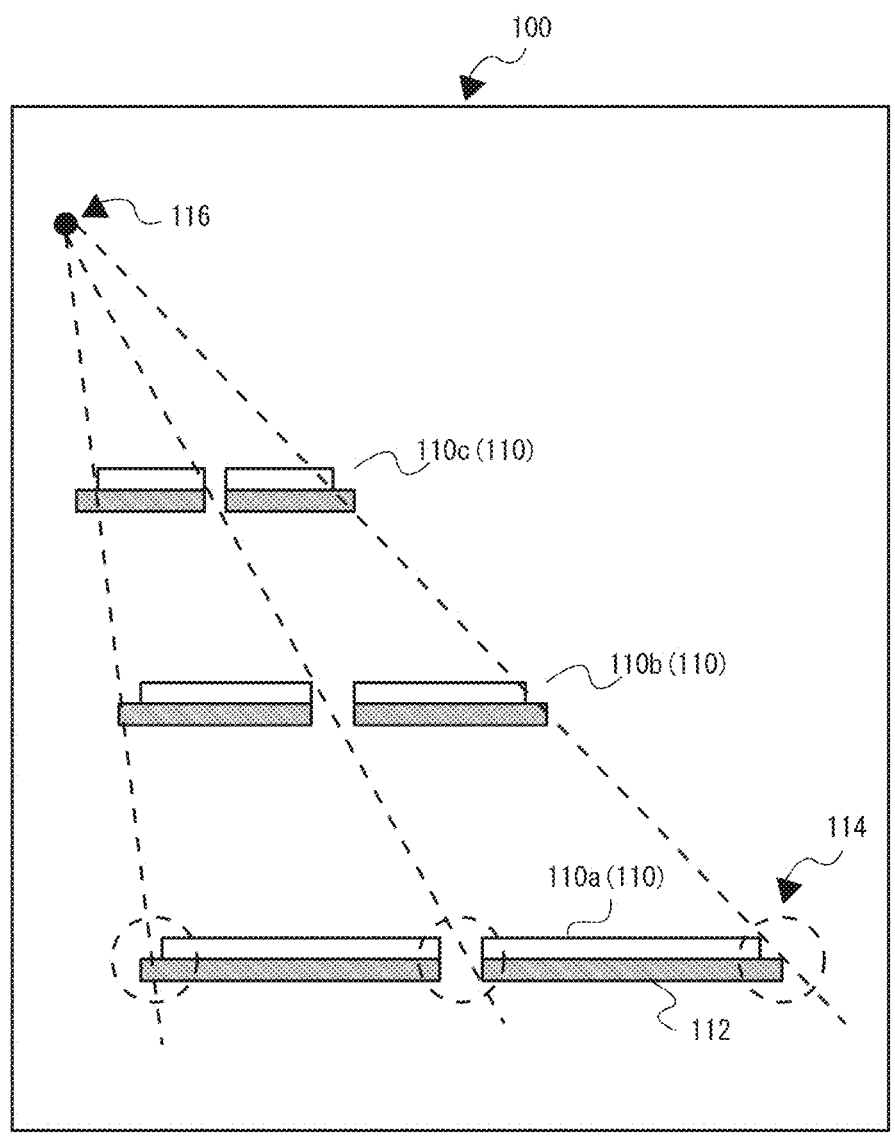
FIG. 10A is a view illustrating an example of a display image according to a third modification.
Figure 10B:
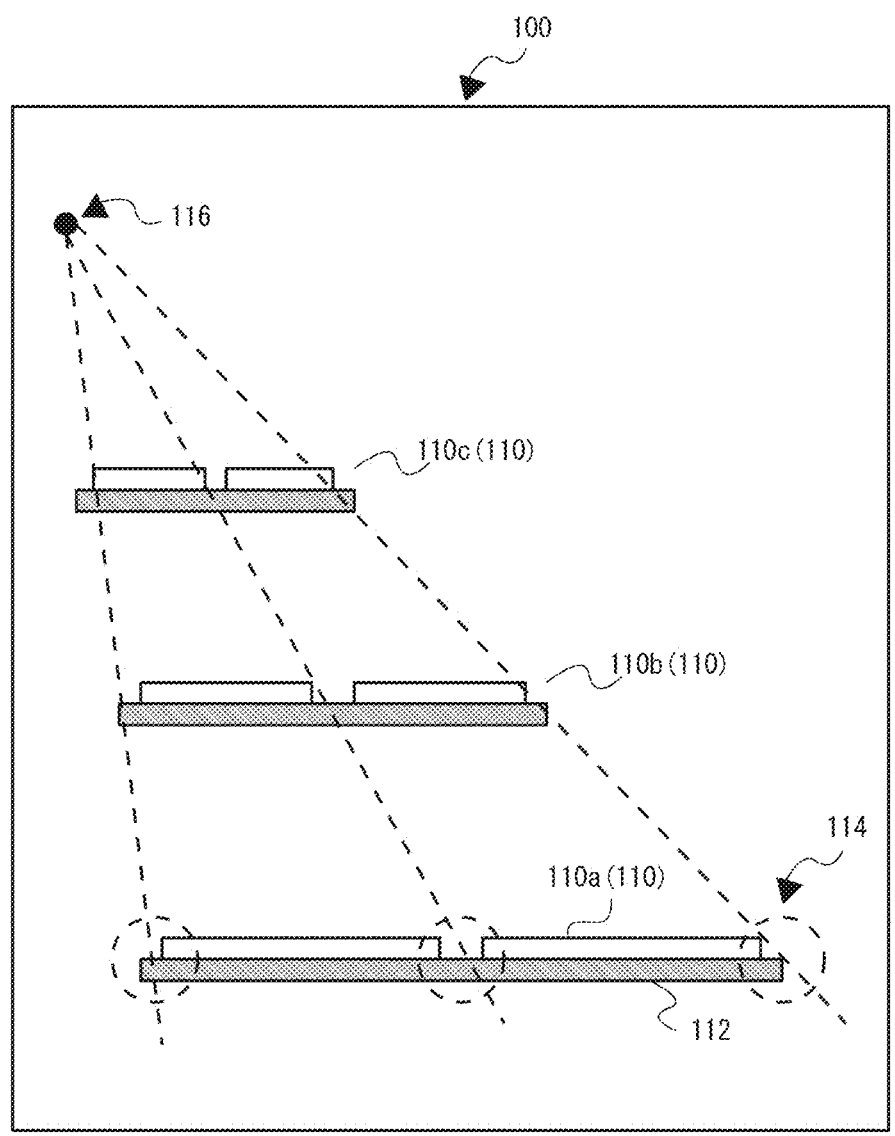
FIG. 10B is a diagram illustrating an example of a display image according to the third modification.

FIGS. 10A and 10B illustrate examples of display images according to the third modification. In FIG. 10A, the length of the distance guidance line 110 is set to be shorter than the length of the auxiliary line 112, and the central portion of the distance guidance line 110 and the auxiliary line 112 is indicated in a disconnected manner (not illustrated). In FIG. 10B, the length of the distance guidance line 110 is set to be shorter than the length of the auxiliary line 112, and the center portion is cut on the distance guidance line 110 alone. Accordingly, three nodes are formed in each of the plurality of distance guidance lines 110 in each of FIGS. 10A and 10B.

The display image 100 of the third modification indicates the distance guidance line 110 itself in a mode having a cut in the middle (in other words, shortened), enabling the driver to visually recognize the position of the node to be a distance guidance in the lateral direction.

A fourth modification will be described. The generator 62 of the display control device 20 may add the auxiliary line 112 to one of the upper side and the lower side of the distance guidance line 110. For example, the generator 62 may add the auxiliary line 112 to overlap the upper region or the lower region of the distance guidance line 110, or may add the auxiliary line 112 to come in contact with the upper side or the lower side of the distance guidance line 110. The generator 62 may generate the display image 100 in which the distance guidance line 110 and the auxiliary line 112 are vertically interchanged at the middle or the end point of the distance guidance line 110. In other words, the generator 62 may generate the display image 100 in which the distance guidance line 110 and the auxiliary line 112 are vertically interchanged in a position where the mode of combination of the distance guidance line 110 and the auxiliary line 112 is to be changed.

Figure 11A:
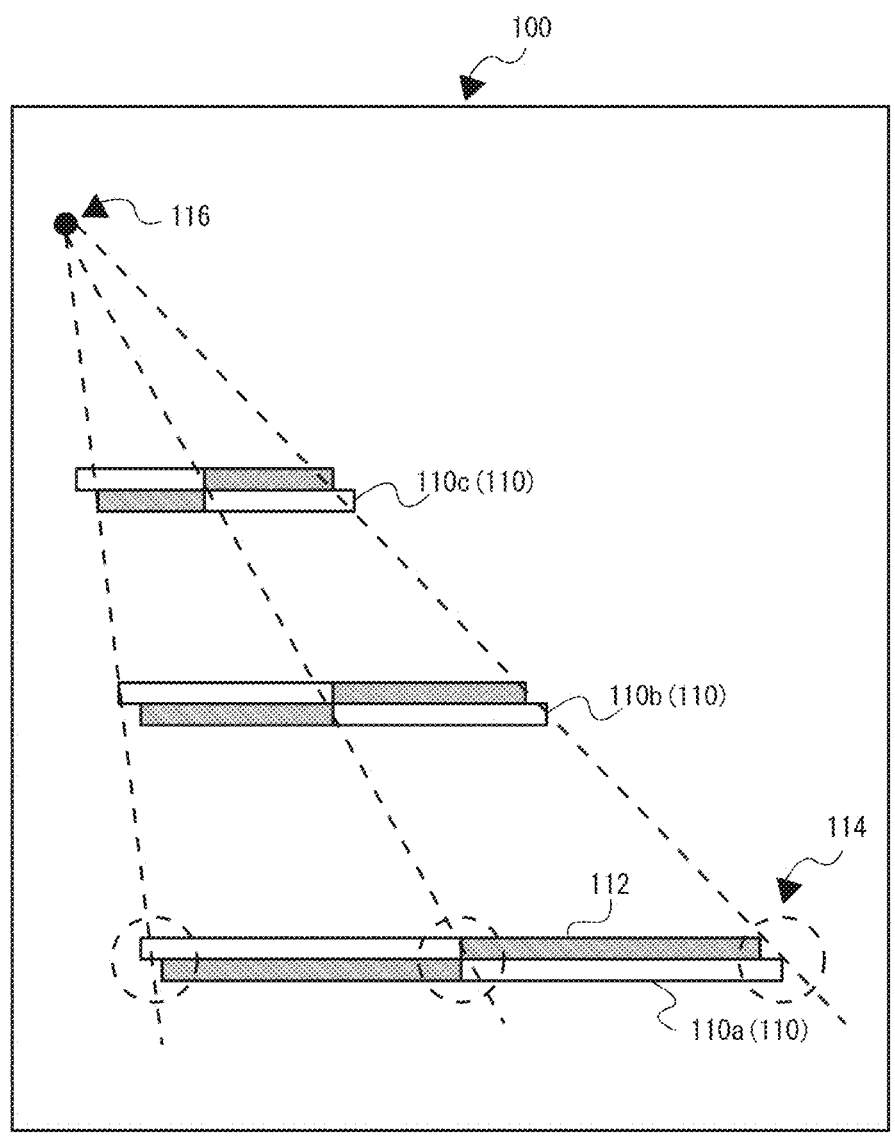
FIG. 11A is a view illustrating an example of a display image according to a fourth modification.
Figure 11B:
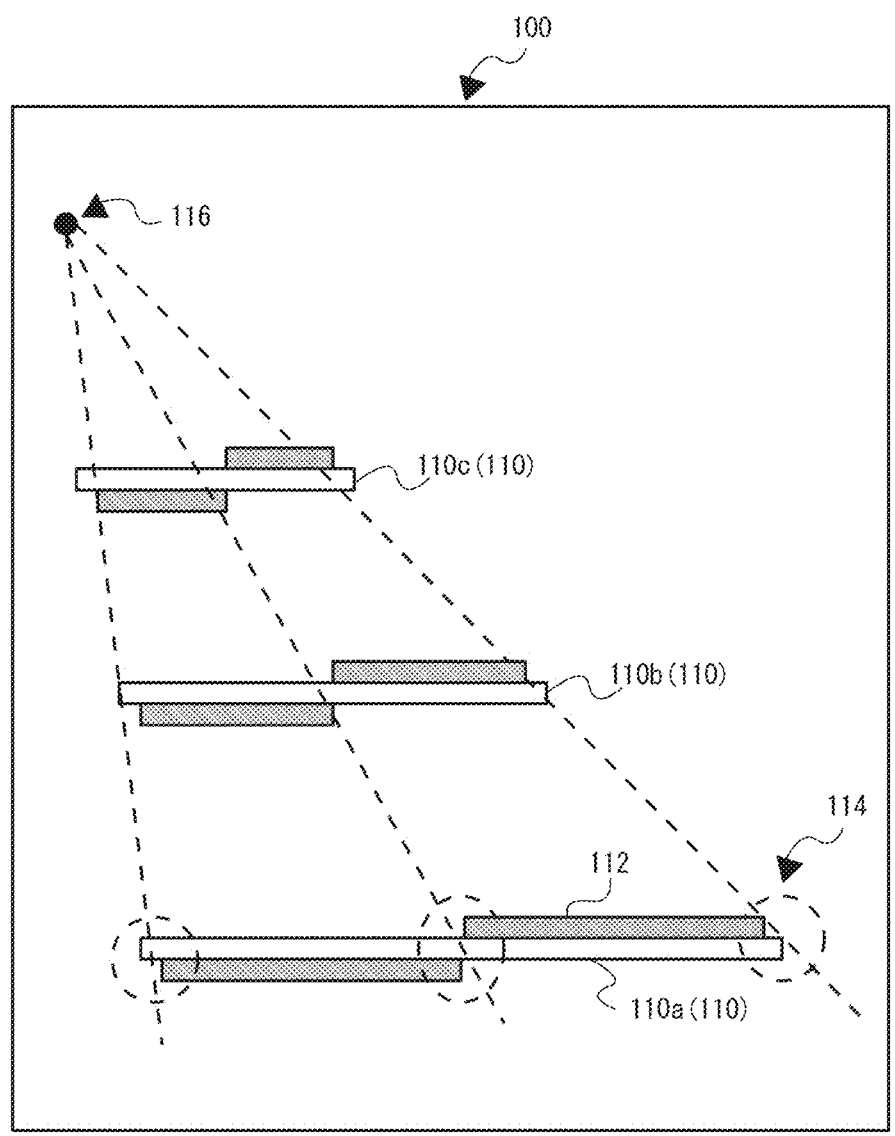
FIG. 11B is a diagram illustrating an example of a display image according to the fourth modification.

FIGS. 11A and 11B illustrate examples of display images according to the fourth modification. In the display image 100 of FIG. 11A, the distance guidance line 110 and the auxiliary line 112 are vertically interchanged at the center portion of the distance guidance line 110, and the positions of the distance guidance line 110 and the auxiliary line 112 are also interchanged. According to this mode, since the set of the distance guidance line 110 and the auxiliary line 112 as a whole fits in a rectangle, enabling a compact display, leading to suppression of deterioration of the visibility of the background.

In contrast, in the display image 100 of FIG. 11B, the longitudinal position of the auxiliary line 112 alone is changed at the center of the distance guidance line 110, having the distance guidance line 110 and the auxiliary line 112 vertically interchanged. This mode would not change the display position of the distance guidance line 110, enabling the driver to easily grasp the distance in the vertical direction (in other words, in the front-rear direction) accurately. In both FIG. 11A and FIG. 11B, the position in which the distance guidance line 110 and the auxiliary line 112 are vertically interchanged would be recognized as a node. Accordingly, in each of FIGS. 11A and 11B, three nodes 114 are formed on each of the plurality of distance guidance lines 110, making it easier for the driver to recognize the distance in the lateral direction.

A fifth modification will be described. In order to display a wide field angle image on the display device 12, the generator 62 of the display control device 20 may compress at least a portion of the captured image output from the imaging device 10 in the lateral direction to generate a display image. In other words, the generator 62 may generate a display image in which the length of the captured image in the lateral direction is reduced. In this case, the generator 62 compresses (reduces) the lateral length of the distance guidance line 110 and the auxiliary line 112 arranged in the compression target region in accordance with a compression ratio. This makes it possible for the driver to grasp the position in the lateral direction in the rear space with the same scale (in other words, the same sense of length) as before compression even in a case where the captured image is compressed in the lateral direction to generate the display image.

Although not described in the above embodiment, the driver can change the setting of the mode (appearance etc.) of the distance guidance line 110 and the auxiliary line 112 via the operation switch 30. The generator 62 of the display control device 20 changes the mode (for example, arrangement position, color, etc.) of the distance guidance line 110 and the auxiliary line 112 in the display image 100 in accordance with the setting information input from the operation switch 30.

In the vehicle surroundings display system 22 of the above-described embodiment, the left and right cameras and the left and right displays are connected to a single display control device 20. Alternatively, however, it is possible, as a modification, to have a configuration in which connection is made to a different display control device 20 for each of the set of the first imaging device 10a and the first display device 12a, and the set of the second imaging device 10b and the second display device 12b. That is, the vehicle surroundings display system 22 may include: a first display control device structured to generate a display image related to the right rear of the vehicle C1; and a second display control device structured to generate a display image related to the left rear of the vehicle C1.

Any combination of the above-described embodiments and modifications would also be useful as an embodiment of the present disclosure. A new embodiment resulting from the combination brings together the effects of each of the combined embodiments and modifications. It is to be understood by those skilled in the art that the functions to be fulfilled by each of constituents described in the claims can be implemented by the each of constituents indicated in the embodiments and the modifications in a single form or in cooperation with each other.

Technologies described in the embodiments and modifications may be specified by the following items.

[Item 1]

A display control device that controls to display an image of surroundings of a vehicle on a display device, the display control device including:

an image processor structured to superimpose a distance guidance line indicating a position away from the vehicle by a predetermined distance and an auxiliary line to be added along the distance guidance line and having an appearance different from the distance guidance line, on the image of the vehicle surroundings, in which a mode of combination of the distance guidance line and the auxiliary line is changed in at least one position.

According to this display control device, it is possible to present to an occupant the portion (hereinafter referred to as "node") where the mode of combination of the distance guidance line and the auxiliary line has been changed as a guidance for the lateral distance from the own vehicle, enabling the occupant to grasp the sense of distance in the lateral direction between the object captured in the image and the own vehicle.

[Item 2]

The display control device according to item 1, in which the distance guidance line is displayed at a plurality of positions with different distances from the vehicle, and the mode of combination of the distance guidance line and the auxiliary line is changed in a position having an equal distance from the vehicle in the lateral direction on the plurality of distance guidance lines.

According to this display control device, arranging the nodes along the plurality of distance guidance lines would make it possible to easily grasp the distance in the lateral direction from the own vehicle, and there is an effect that the nodes aligned in a line in the depth direction can be perceived as a line extending toward a vanishing point. This effect leads to acquisition of a guidance of the distance in the lateral direction even in a position where there is no distance guidance line.

[Item 3]

The display control device according to item 1 or 2, in which the positions of changing the mode of combination of the distance guidance line and the auxiliary line are five or less positions.

According to this display control device, the number of nodes formed on the distance guidance line is restricted to a small number. This makes it possible for the occupant to easily recognize the nodes in a short time as a guidance of distance in the lateral direction from the own vehicle. In addition, when arranging a plurality of distance guidance lines, it is easy to obtain an effect that the nodes arranged in line in the depth direction is perceived like a line towards a vanishing point, making it possible to obtain a guidance of distance in the lateral direction even in a position where there is no distance guidance line.

[Item 4]

The display control device according to any of items 1 to 3, in which the image processor adds the auxiliary line to overlap at an upper side or a lower side or both sides of the distance guidance line, and does not add the auxiliary line in a position where the mode of combination of the distance guidance line and the auxiliary line is to be changed.

This display control device makes it possible for the occupant to easily recognize the portion with no added auxiliary line as a node, enabling the occupant to easily grasp the sense of distance in the lateral direction between an object appearing in the captured image and the own vehicle. In addition, since the distance guidance line and the auxiliary line are contained in a small area, there is an effect of restricting the range hidden by the distance guidance line and the auxiliary line.

[Item 5]

The display control device according to one of items 1 to 3, in which the image processor adds the auxiliary line to a position coming in contact with an upper side or a lower side or both sides of the distance guidance line or to a position parallel to the distance guidance line at a predetermined interval, and does not add the auxiliary line in the position where the mode of combination of the distance guidance line and the auxiliary line is to be changed.

According to this display control device, the auxiliary line does not hide the distance guidance line, and thus, there is a feature that makes it easy to grasp the sense of distance in the depth direction, making it possible to recognize the portion having no added auxiliary line as a node. This enables the occupant to easily grasp the sense of distance of the own vehicle in the lateral direction. In addition, providing an interval between the distance guidance line and the auxiliary line would suppress a case where the surroundings video image in the background is hidden continuously by the distance guidance line and the auxiliary line. This leads to an effect of reducing the degree of hindrance to visual recognition of the surroundings video image of the background.

[Item 6]

The display control device according to any of items 1 to 5, in which the image processor adds the auxiliary line to run along an upper side or a lower side or both sides of the distance guidance line, and interrupts both the distance guidance line and the auxiliary line in a position where the mode of combination of the distance guidance line and the auxiliary line is to be changed.

This display control device makes it possible for the occupant to easily recognize the interrupted portion in the distance guidance line as a node, enabling the occupant to easily grasp the sense of distance between an object appearing in the captured image and the own vehicle.

[Item 7]

The display control device according to any of items 1 to 6, in which the image processor adds the auxiliary line to run along an upper side or a lower side or both sides of the distance guidance line, and vertically interchanges the distance guidance line and the auxiliary line in a position where the mode of combination of the distance guidance line and the auxiliary line is to be changed.

This display control device makes it possible for the occupant to easily recognize the portion where the distance guidance line and the auxiliary line have been vertically interchanged as a node, enabling the occupant to easily grasp the sense of distance between an object appearing in the captured image and the own vehicle.

[Item 8]

A vehicle surroundings display system including:

an imaging device structured to image surroundings of a vehicle;

a display control device structured to generate a display image having a distance guidance line indicating a position away from the vehicle by a predetermined distance and an auxiliary line to be added along the distance guidance line and having an appearance different from the distance guidance line superimposed on the image of the vehicle surroundings captured by the imaging device; and a display device structured to display the display image generated by the display control device, in which the display control device generates a display image in which a mode of combination of the distance guidance line and the auxiliary line is changed in at least one position.

According to this vehicle surroundings display system, it is possible to present to an occupant the portion where the mode of combination of the distance guidance line and the auxiliary line has been changed as a guidance for the lateral distance from the own vehicle, enabling the occupant to grasp the sense of distance in the lateral direction between the object captured in the image and the own vehicle.

[Item 9]

A computer program that causes a computer to execute: processing of obtaining an image of vehicle surroundings imaged by an imaging device;

processing of generating a display image having a distance guidance line indicating a position away from the vehicle by a predetermined distance and an auxiliary line to be added along the distance guidance line and having an appearance different from the distance guidance line superimposed on the obtained image; and processing of outputting the generated display image to a display device, in which the processing of generating the display image generates the display image in which a mode of combination of the distance guidance line and the auxiliary line is changed in at least one position.

According to this computer program, it is possible to present to an occupant the node where the mode of combination of the distance guidance line and the auxiliary line has been changed as a guidance for the lateral distance from the own vehicle, enabling the occupant to grasp the sense of distance in the lateral direction between the object captured in the image and the own vehicle.

What is claimed is:

1. A display control device that controls to display an image of surroundings of a vehicle on a display device, the vehicle having a front end, a rear end, a left side and a right side, the display control device comprising:

a memory structured to store a plurality of instructions; and a processor structured to operate as follows when the processor executes the plurality of instructions stored in the memory, wherein the operation includes:

an operation of displaying, on the display device, an image obtained by superimposing a distance guidance line indicating a position away from the vehicle by a predetermined distance and an auxiliary line to be added along the distance guidance line and having an appearance different from the distance guidance line, on the image of the vehicle surroundings; and an operation of changing a mode of combination of the distance guidance line and the auxiliary line in at least one position, wherein the distance guidance line is displayed in a plurality of positions with different distances from the vehicle, and the mode of combination of the distance guidance line and the auxiliary line is changed along positions having an equal distance from one of the left side or the right side of the vehicle on the plurality of distance guidance lines, and positions having an equal distance from the one of the left side or the right side of the vehicle on the plurality of distance guidance lines are aligned in a vanishing point direction.

2. The display control device according to claim 1, wherein the positions of changing the mode of combination of the distance guidance line and the auxiliary line are five or less positions.

3. The display control device according to claim 1, wherein the operation further includes operation of adding the auxiliary line to overlap an upper side or a lower side or both sides of the distance guidance line and not adding the auxiliary line in a position where the mode of combination of the distance guidance line and the auxiliary line is to be changed.

4. The display control device according to claim 1, wherein the operation further includes operation of adding the auxiliary line to a position coming in contact with an upper side or a lower side or both sides of the distance guidance line or to a position parallel to the distance guidance line at a predetermined interval and not adding the auxiliary line in the position where the mode of combination of the distance guidance line and the auxiliary line is to be changed.

5. The display control device according to claim 1, wherein the operation further includes an operation of adding the auxiliary line to run along an upper side or a lower side or both sides of the distance guidance line and interrupting both the distance guidance line and the auxiliary line in a position where the mode of combination of the distance guidance line and the auxiliary line is to be changed.

6. The display control device according to claim 1, wherein the operation further includes an operation of adding the auxiliary line to run along an upper side or a lower side or both sides of the distance guidance line and vertically interchanging the distance guidance line and the auxiliary line in a position where the mode of combination of the distance guidance line and the auxiliary line is to be changed.

7. A vehicle surroundings display system comprising:
an imaging device structured to image surroundings of a vehicle, the vehicle having a front end, a rear end, a left side and a right side;

a display control device structured to generate a display image having a distance guidance line indicating a position away from the vehicle by a predetermined distance and an auxiliary line to be added along the distance guidance line and having an appearance different from the distance guidance line superimposed on the image of the surroundings of the vehicle captured by the imaging device; and a display device structured to display the display image generated by the display control device, wherein the display control device includes:

a memory structured to store a plurality of instructions; and a processor structured to operate as follows when the processor executes the plurality of instructions stored in the memory, and the operation includes an operation of generating a display image in which a mode of combination of the distance guidance line and the auxiliary line is changed in at least one position, wherein the distance guidance line is displayed in a plurality of positions with different distances from the vehicle, and the mode of combination of the distance guidance line and the auxiliary line is changed along positions having an equal distance from one of the left side or the right side of the vehicle on the plurality of distance guidance lines, and positions having an equal distance from the one of the left side or the right side of the vehicle on the plurality of distance guidance lines are aligned in a vanishing point direction.

8. A display control device that controls to display an image of surroundings of a vehicle on a display device, the vehicle having a front end, a rear end, a left side and a right side, the display control device comprising:

an image processor structured to superimpose a distance guidance line indicating a position away from the vehicle by a predetermined distance and an auxiliary line to be added along the distance guidance line and having an appearance different from the distance guidance line, on the image of the vehicle surroundings, wherein a mode of combination of the distance guidance line and the auxiliary line is changed in at least one position, the distance guidance line is displayed in a plurality of positions with different distances from the vehicle, and the mode of combination of the distance guidance line and the auxiliary line is changed along positions having an equal distance from one of the left side or the right side of the vehicle on the plurality of distance guidance lines, and positions having an equal distance from the one of the left side or the right side of the vehicle on the plurality of distance guidance lines are aligned in a vanishing point direction.

* * * * *